M. M. ZELLERS.
AUTOMATIC SAFETY DEVICE FOR TROLLEY POLES.
APPLICATION FILED JAN. 18, 1909.

954,907.

Patented Apr. 12, 1910.

ATTEST
E. M. Fisher
F. C. Mussun.

INVENTOR
Mahlon M. Zellers.
BY Fisher & Moser ATTYS

UNITED STATES PATENT OFFICE.

MAHLON M. ZELLERS, OF BELLEVILLE, ILLINOIS.

AUTOMATIC SAFETY DEVICE FOR TROLLEY-POLES.

954,907.

Specification of Letters Patent.   Patented Apr. 12, 1910.

Application filed January 18, 1909. Serial No. 472,914.

*To all whom it may concern:*

Be it known that I, MAHLON M. ZELLERS, citizen of the United States, residing at Belleville, in the county of St. Clair and State of Illinois, have invented certain new and useful Improvements in Automatic Safety Devices for Trolley-Poles, of which the following is a specification.

My invention relates to an automatic safety device for trolley poles adapted to drop the trolley the instant it leaves the wire and thus prevent injury to the overhead work, all substantially as shown and described and particularly pointed out in the claims.

Figure 1:
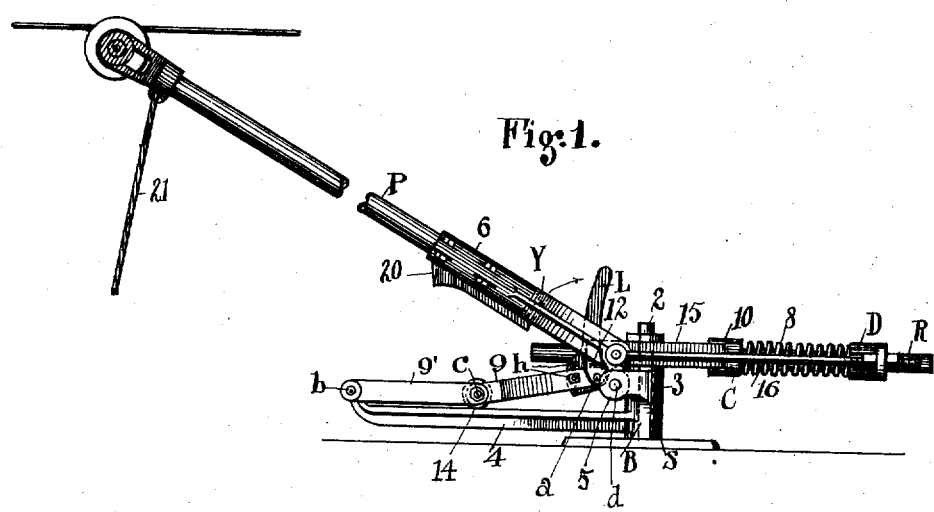
Figure 2:
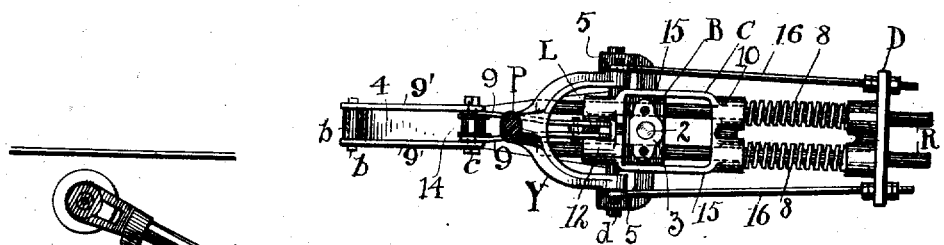
Figure 3:
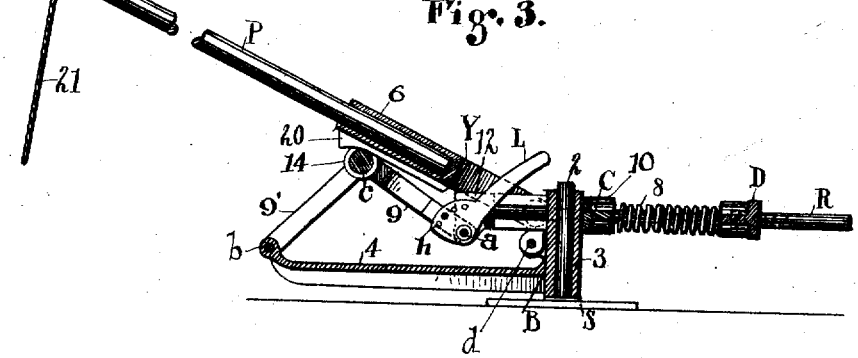

In the accompanying drawings, Figure 1 is a side elevation of the invention showing the trolley in working position. Fig. 2 is a plan view thereof with the trolley pole broken away, and Fig. 3 is a sectional side elevation with the trolley and pole down as when released by an automatic mechanism.

Having reference now to the several parts, S represents the trolley stand proper, which is fixed to or upon the top of the car in any suitable way and has a spindle 2 rigid therewith and upon which the remainder of the mechanism is rotatably mounted.

B represents a so-called stand body, having a hub portion 3 mounted on spindle 2, an arm 4 projecting horizontally therefrom at its bottom, and ears 5 at its sides on which the trolley pole base or yoke Y is pivoted. Said yoke has a socket 6 carrying trolley pole P. The hub portion 3 of body part B is provided at its sides with horizontal bores or holes and parallel rods R are mounted in these bores and fixed therein by set screws or otherwise. Said rods project through said bores upon both sides thereof, but their greater length is outward away from the trolley, and a controlling spring 8 is mounted on each rod and compressible thereon to sustain the trolley in, raised or working position as will now be seen. Thus, if the trolley be not under the tension and control of said springs it has nothing to hold it up and it drops and remains down as seen in Fig. 3 until restored to service by the conductor, Fig. 1. Therefore, there is mechanism intermediate of said springs and the trolley, first to sustain the trolley in working position as long as it remains on its wire, and, secondly, to trip said sustaining mechanism and drop the trolley when it leaves the wire. This occurs immediately upon the trolley leaving the wire, because the tripping parts are so arranged and set that when the trolley leaves the wire and flies upward under the power of springs 8, it will strike the tripping lever L and release said springs and of course drop. Now, taking up these mechanisms more in detail, the tension or lift springs 8 are supported between two cross heads, C and D, respectively, on said rods. The head C is described as double because it has a front portion 10 sleeved on said rods and the ends of springs 8 socketed therein, and a rear portion 12 also sleeved on said rods and provided with a pivot *a* intermediately at its bottom carrying said tripping lever L and one end of the toggle links 9 in the two pairs of said links 9 and 9'. The other pair 9' of said links is pivoted at *b* on the extremity of arm 4. The middle ends of said links meet and are pivoted at *c*, and a roller or spool 14 is mounted in pivot *c* between said links. The said links are in pairs, preferably, and adapted to straighten and shut down far enough below the dead center line to come to a braced and locked position from which they will not be released by the usual jarring and jolting of the car, see Fig. 1. Lever L preferably has a quadrant at its base provided with a series of holes *h* and a pin adapted to engage through any one of said holes and corresponding holes in the adjacent links 9. By this means lever L can be set in respect to said links and the trolley at any desired angle or inclination to trip more or less quickly when the trolley flies its track, the setting position of said lever in this instance being practically vertical, Fig. 1. It might be adjusted in either direction, as shown, but when adjusted is made rigid with links 9. Operatively, therefore, the parts are the same as if links 9 and lever L were in one piece.

Cross head C has a central open space between its ends 10 and 12 and side portions 15 connecting said ends to accommodate itself to hub 3, in respect to which it has a sliding movement equal substantially to the full length of said open space. Cross head D is also slidable on rods R, and has sockets for the corresponding ends of springs 8. Finally, a link or rod 16 on each side connects head D with the trolley pole yoke Y a short distance above its pivot *d* on base B and in such relation to said parts relatively that when the pole is drawn down its full limit by the conductor to set the device the cross head D will be drawn inward correspondingly and contribute in that measure to the compression of the springs, while at the same time and in the same operation the cross head C is forced forward by a downward pressure exerted upon the toggle links at their middle in or through the bearing roller 14 therein engaged by the curved fin or rib 20 on the bottom of yoke Y. This is illustrated in Fig. 3, and to set or reëstablish the parts after the trolley has jumped the wire and automatically released itself by striking lever L and throwing the parts into position Fig. 3, the conductor or operator simply pulls down on rope 21 till the parts take position, Figs. 1 and 2, and which they will hold when such down pressure is released and the trolley is restored to the wire. In this case the two cross heads are drawn or pressed toward each other and springs 8 compressed so as to have all the sustaining power the trolley pole requires. Then, the tripping mechanism as such is out of trolley connection and cross head C fixed in position as shown in Fig. 2, but cross head D is in playing relation to or with the trolley through links 16 and applies the spring tension thereto through said links. It follows that when the trolley leaves the wire the tripping mechanism automatically takes care of it at once and cuts out the spring tension by yoke Y striking lever L and thus releasing cross head C. This occurs more quickly and reliably than could be done by an attendant if present for this purpose, but such accidents usually take place without warning and often when the conductor is in another part of the car collecting fares or the like. Obviously, the cross head C being released by actuating lever L the springs 8 will force it back and relieve spring tension and hence dropping of the trolley pole must instantly follow. This is the first thing sought to be accomplished by my invention because in this lies all the safety. The rest of the mechanism has to do with reëstablishing and maintaining working conditions as above described.

This device is of great convenience in any case when one or two trolley poles are used, as either can be instantly released and dropped by the operator, and in the case of two poles the idle one will lie down out of the way while at the same time the springs are liberated and relieved of all strain. This is a material improvement over all other methods known to me and in which the tension always remained on the springs when the trolley poles were tied or fastened down.

What I claim is:

1. A trolley pole and a stand therefor having a horizontal arm and two side ears, a pair of rods supported at the sides of said stand, cross-heads on the ends of said rods and springs between said cross-heads on said rods, and a trip mechanism to release the springs comprising a contact member in the path of the pole pivotally mounted on one of said cross heads and toggle links with which said member is operatively connected and which are pivoted at one end on said arm and at the other to the cross head carrying said contact member.

2. The combination of the stand and the trolley having a vertical hub and a horizontal arm and ears oppositely at its sides, a pole supporting yoke pivotally mounted in said ears having a socket for the pole and a rib lengthwise at its bottom, a pair of rods adjustably fixed in said stand and two cross heads slidably mounted thereon, toggle links connecting one of said heads with said arm on the stand and springs on said rods bearing against the other cross-head, and side rods connecting said latter crosshead with said yoke at a point relatively above the pivot of the yoke on said stand.

3. A trolley pole supporting yoke and a stand on which it is pivoted, a pair of rods fixed horizontally on said stand, a pair of cross heads slidably mounted on said rods and springs on the rods between said heads, in combination with side connections between one of said cross heads and said yoke, a tripping lever and link mechanism adapted to be actuated by said pole when it jumps the wire and allows the trolley to drop by gravity.

4. In a trolley safety mechanism, a pole and means to hold the pole at work comprising a stand and rods mounted thereon, two separate cross heads on said rods and springs between the same on said rods, in combination with toggle link connections between said pole and one of said cross heads and said stand and connecting rods between the other of said cross heads and the base of the trolley pole, whereby the tension of said springs is exerted to hold the trolley pole raised and the collapse of said toggle links permits the pole to drop.

In testimony whereof I affix my signature in presence of two witnesses.

MAHLON M. ZELLERS.

Witnesses:
 FRED S. FLEISCHBEIN,
 WANDA M. HEINRICH.